Patented June 26, 1951

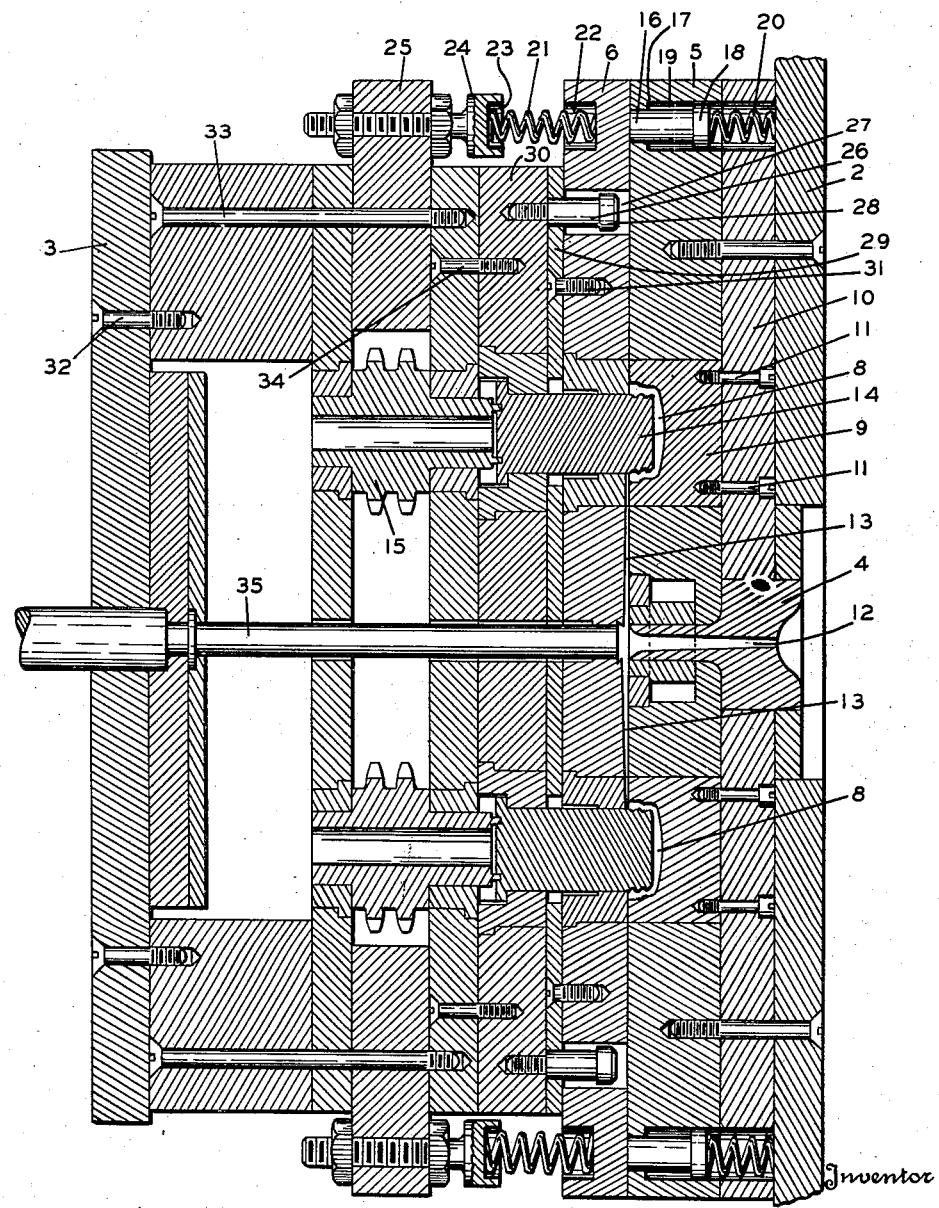
Fig. I

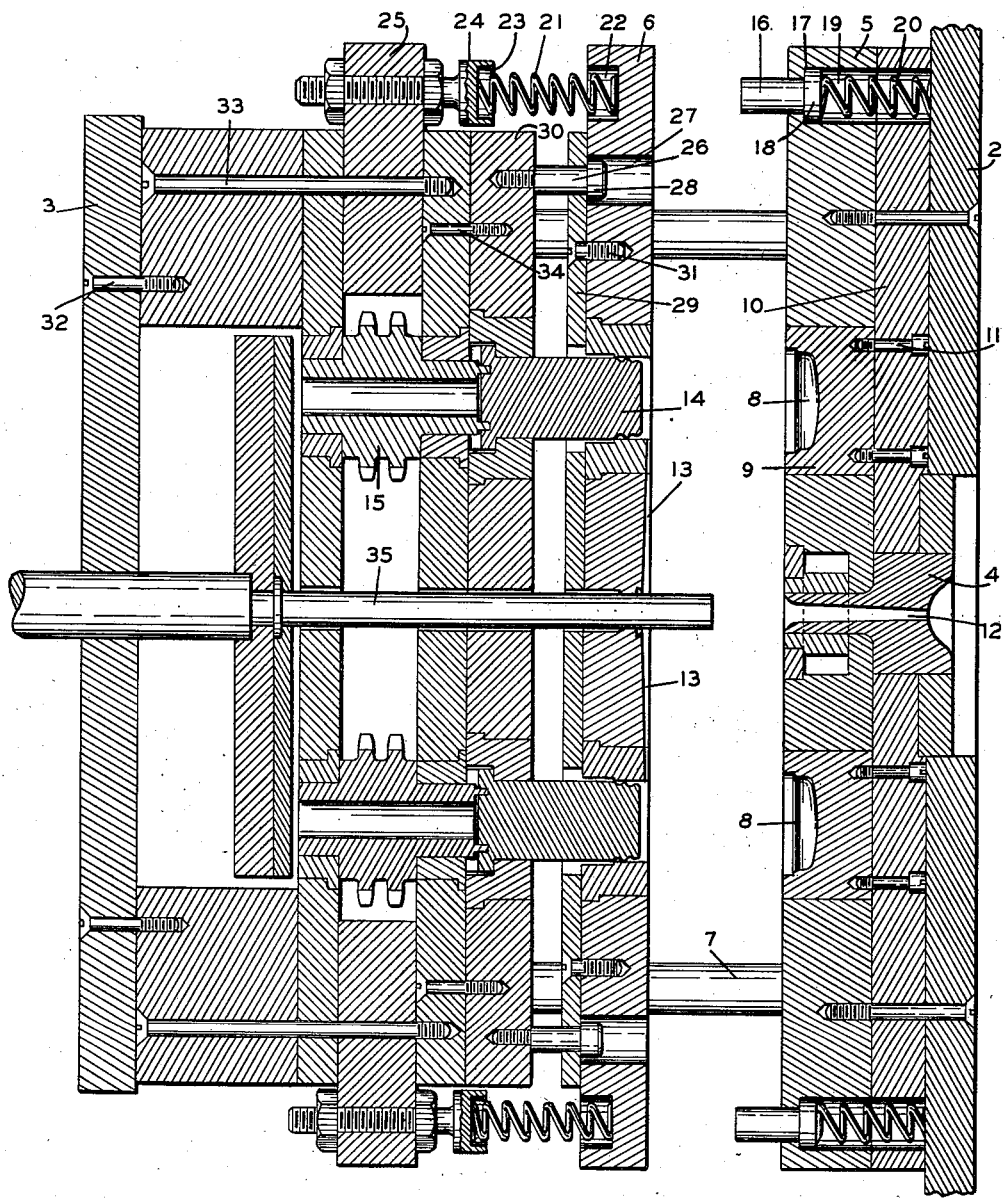

2,558,027

UNITED STATES PATENT OFFICE 2,558,027

INJECTION MOLDING MACHINE

Gardiner C. Wilson, Lancaster, Pa., assignor to Armstrong Cork Company, Lancaster, Pa., a corporation of Pennsylvania Application December 30, 1947, Serial No. 794,567

9 Claims. (Cl. 18—42)

This invention relates to injection molding machines for forming from thermoplastic or thermosetting composition a plurality of threaded articles connected to one another and, more particularly, to an injection molding machine for forming a plurality of threaded articles in a plurality of cavities to which molding composition is supplied from a common source and ejecting the molded articles as separate units.

This invention is particularly adapted for use with an injection molding machine having a spring-actuated stripper plate suitable for use with the device illustrated and described in my U. S. Patent No. 2,339,443, issued January 18, 1944.

The chief object of my invention is to provide an injection molding machine for forming a plurality of threaded articles in which means are provided to sever the gate connected to each molded article and eject the articles as individual units.

A further object of my invention is to provide a molding device comprising conventional mold cavities and force plugs suitable for molding threaded articles from thermoplastic or thermosetting molding composition and in which the molded article is ejected from the mold by partially unscrewing the force plug and thereafter stripping the article from the force plug.

A still further object is to provide a mold assembly including mold cavities, force plugs, and a stripper plate, and means for holding the stripper plate inactive while the preliminary unscrewing of the force plugs from the molded articles is being accomplished.

In the production of threaded molded articles from resilient, flexible material such as polymerized ethylene, "Polythene," it has been found that, if the finished article is stripped from the force plug, the screw thread formation on the article is permanently deformed to a considerable extent. In order to overcome this difficulty, I have developed a device which makes it possible to break the initial bond between the force plug and the molded article by partially unscrewing the force plug from the molded article and thereafter stripping the article from the force plug. During this initial unscrewing, the molded article is held from rotation by its frictional engagement with the interior of the mold cavity. This frictional engagement between the molded article and the cavity may be enhanced by the provision of a decorative design on the wall of the cavity which will produce a decoration on the outer surface of the molded article.

When the mold has opened far enough to remove the molded article completely from the cavity, the frictional drag between the rotating force plug and the molded article is greater than the resistance of the gate to rupture. This frictional drag causes the molded article to rotate with the force plug, after the gate has been severed. After the initial unscrewing has been accomplished and the gate has been severed, the article is then stripped from the force plug by means of a stripper plate which engages the bottom edge of the skirt of the article and strips it over the remaining threads on the force plug with a minimum of distortion to the conformation of the thread.

To carry out the steps recited above in their proper order, I have developed an injection molding machine for forming a plurality of threaded articles comprising in combination a mold plate having a plurality of mold cavities, injecting means extending through said plate, a second mold plate from which extends a plurality of rotatable members adapted to form the inner surface of the article to be molded, one or both of said plates having channels therein connecting a common feeding channel and the mold cavities when the mold is closed, said second mold plate being spring-actuated to act as a stripper plate to remove the molded articles from the rotatable members, the means for actuating said mold plate being held under compression when the mold is closed and for a predetermined period after the mold has started to open, and thereafter being released to permit movement of the stripper plate to strip the molded articles from the rotatable members.

In order that my invention may be more readily understood, it will be described in connection with the attached drawings in which:

Figure I is a sectional view of an injection molding machine illustrating the mold is closed position; and Figure II is a sectional view of an injection molding machine illustrating the position of the various parts when the mold is open.

Referring to the drawings, there is shown a standard form of injection molding machine which includes a pair of opposed mold foundation plates 2 and 3, suitably mounted upon press platens (not shown). Fixed mold plate 5 and movable mold plate 6, which also serves as a stripper plate, are carried respectively by suitable guide pins 7 (Figure II). The opposing assemblies are kept in alignment by means of these guide pins. Plate 5 contains a plurality of mold cavities 8 adapted to form the exterior contour of the article to be molded. Preferably, for ease in making various sizes of articles, such cavities 8 are formed as small removable elements 9 disposed in openings in the plate 5 and secured to the plate 10 by machine screws 11. This plate 10 is, in turn, secured to foundation plate 2. Preferably, mold plate 5 is a resistance plate usually held in a fixed position, while mold plate 6 is a plate movable toward and from the mold plate 5 when the mold opens and closes. A sprue bushing 4 projects through a central opening in the plate 2 and is adapted to direct molding composition into a charging port 12 which passes through the mold plate 5. The companion mold plates 5 and 6 have formed in their parting surfaces runner channels 13 leading from the port 12 to the various mold cavities 8 to distribute to the latter the molding composition injected through the port 12. Such channels 13 may be formed in the surface of either mold plate 5 or mold plate 6 or, if desired, portions of the channels may be formed in both surfaces.

Molding members or force plugs 14 extend through the plate 6 and beyond its parting surface and are adapted to extend into the cavities 8 to form the inner surface of the articles to be molded when the mold is closed and plates 5 and 6 are in engagement. I will describe one mold unit only since the units are similar in design and actuated in the same manner. The member 14 is held in predetermined position with respect to the foundation plate 3 and is rotatable about its axis but does not move to any substantial extent in a direction along its axis. A force plug driving member 15 which may be a sprocket or a gear is connected to the end of the member 14 opposite the end extending into the cavity and is adapted to be engaged by a suitable driving means (not shown) to rotate the member 14.

Headed pins 16 are disposed in holes 17 in mold plate 5. The heads 18 of the pins 16 are engageable with shoulders 19 of the mold plate 5 to limit movement of the pins 16. These pins 16 are urged outwardly by means by springs 20 which are compressed between the foundation plate 2 and the heads 18 of the pins. When the mold is closed, as shown in Figure I, the pins 16 are held in their retracted position by engagement with the mold plate 6. As the mold is opened, the springs 20 force the pins 16 outwardly until the heads 18 strike the shoulders 19 of the mold plate 5.

Springs 21 are provided to move mold plate 6 toward mold plate 5 only after the mold plates 5 and 6 have been parted and are spaced apart a predetermined distance. These springs 21 fit into recesses 22 in the mold plate 6. The other ends of springs 21 are received in recesses 23 formed in the heads of adjusting members 24. The adjusting members 24 are affixed to a plate 25. Springs 21 are held under compression when the mold is in closed position. Upon opening of the mold, springs 21, which purposely exert a lesser force than springs 20, are maintained in their compressed condition by the reaction of springs 20 acting through pins 16 which hold plate 6 in the position shown in Figure I until the plates 5 and 6 have been parted to a position where the heads 18 of the pins 16 lie in engagement with the shoulders 19 of plate 5. By means of adjusting members 24 the compression of springs 21 can be readily controlled. When the mold has opened sufficiently to permit the heads 18 of pins 16 to engage the shoulders 19, the outward movement of pins 16 ceases, and inasmuch as the means for holding springs 21 under compression have been removed, the springs 21 force mold plate 6 forward so that it acts as a stripper plate to remove the molded articles from the force plugs 14. The forward movement of mold plate 6 is limited by pins 26 positioned in holes 27 in the mold plate 6. Each of these pins 26 is provided with an enlarged head 28 at one end, and the other end passes through a back-up plate 29 and threadedly engages plate 30. Back-up plate 29 is affixed to mold plate 6 by means of machine screws 31. Plate 30 and all the plates lying between it and the rear of the press are secured to the foundation plate 3 and to one another by means of a series of machine screws 32, 33, and 34. Since the holes in the back-up plate 29 through which the pins 26 pass are of a diameter smaller than the diameter of the heads 28 of the pins 26, the forward movement of the mold plate 6 is stopped when the heads 28 strike the plate 29.

Figure II of the drawing shows the position of the various parts of the mold when the mold is in its open position.

It will be understood that for purposes of illustration, springs 20 and 21 are shown in axial alignment; however, it is not necessary for these springs to be in axial alignment. In the preferred embodiment, the mold is provided with four sets of springs 20 and 21, one set at each corner of the mold. However, it will be understood that any number of springs may be used. As stated earlier in the specification, spring 21 must of necessity be weaker than spring 20, however, this can be controlled by using a lesser number of springs 21 than springs 20 so long as the total force exerted upon the movable mold plate 6 by the pins 16 is greater than the force exerted on the movable plate 6 by the springs 21. It will also be understood that instead of springs, any suitable mechanism, such as hydraulic pistons, pneumatic cylinders, etc., may be used.

In using hydraulic cylinders or pneumatic cylinders in carrying out my invention it will be understood that the piston actuating mold plate 6 can be suitably controlled so that the plate will not impart a stripping force on the molded article until the mold has opened sufficiently to accomplish the initial unscrewing and gate-severing referred to earlier. In utilizing a structure of this kind, it is obvious that it will not be necessary to provide means on mold plate 5 to hold mold plate 6 inactive during the initial phase of the mold opening cycle.

In the operation of the molding device above described, the mold is in the closed position shown in Figure I at the start of the cycle. A charge of molding composition such as polymerized ethylene, known as "Polythene," is forced by the injector through the sprue or charging port 12 which is in communication with runner channels 13. The molding composition flows through these runner channels 13 into the mold cavities 8, completely filling the cavities. After the molding composition has set, there is formed a molded piece consisting of, for example, four threaded articles, such as closures, connected as an integral unit by runners formed from the composition in the channels 13 and the port 12.

In removing such molded article from the mold, the mold plate 3 is retracted from foundation plate 2 and substantially simultaneously therewith the members 14 are rotated. As the plate 3 retracts, expansion of the springs 20 forces pins 16 outwardly which, in turn, force mold plate 6 to follow plate 3, holding springs 21 under compression. The rotary motion imparted to the force plugs 14 partially unscrews the molded articles from the threaded members. The molded articles are held from rotation by their engagement with the inside of the cavities 10 and the connecting runner channels. When the mold has opened sufficiently far that the exterior of the molded articles is no longer in engagement with the interior of the mold cavities, the friction between the rotating force plugs and the molded articles is sufficiently great to rotate the molded articles with the force plugs and sever the gate connecting the articles to the runner. At about the same time that the molded articles are freed from cavities 8, the heads 18 of pins 16 engage the shoulders 19 and, therefore, cease to hold the springs 21 under compression. Springs 21 then expand, forcing mold plate 6 toward fixed mold plate 5. This mold plate 6 engages the bottom edge of the skirt of the molded articles and strips them from the screw threads of the force plugs Mold plate 6 continues its movement toward plate 5 until the heads 28 of pins 26 engage plate 29.

After the molded articles have been stripped from the force plugs, they are free to fall by gravity into any suitable collecting receptacle. The excess molding composition remaining in the runner channels 12 and 13 may be removed by an ejector 35 which moves forward through the center of the mold. After the molded articles and the excess molding composition have been removed from the mold, the mold is closed and the cycle repeated.

It will be observed that my invention provides a simple mechanism for the removal of screw threaded articles from a mold. The mechanism is automatic and simple in construction and may be operated with a minimum of shut-downs for adjustment, etc. My mechanism is effective to efficiently remove a plurality of threaded closures as individual units. Breakage and cracking of such articles during the removal operation is substantially obviated.

While I have described and illustrated a preferred embodiment of my invention, it will be understood that my invention is not so limited since it can be otherwise employed within the scope of the following claims.

I claim:

1. In an injection molding machine for forming simultaneously a plurality of threaded articles, the combination of a fixed resistance plate having cavities therein, a movable mold member, a mold plate supported by said movable mold member, movable toward and from said fixed plate, means for yieldably supporting said mold plate including springs so disposed as to urge said plate away from said movable mold member to apply force to the molded articles to release them from threaded members, injecting means, rotatable threaded members extending through the mold plate and into the fixed plate cavities when the mold is closed to form the interior surface of the molded articles, and runner channels connecting the injecting means and the mold cavities, means disposed on said fixed plate to move said mold plate with said movable mold member while the mold opens a predetermined distance to permit the initial unscrewing, said yieldably supporting means, thereafter moving said mold plate forward to urge the molded articles outwardly to strip them over the threads of said threaded members after initial unscrewing has been accomplished.

2. In an injection molding machine for forming simultaneously a plurality of threaded articles, the combination of a fixed resistance plate having cavities therein, a movable mold member, a mold plate supported by said movable mold member movable toward and from said fixed plate, means for yieldably supporting said mold plate including springs so disposed as to urge said plate away from said platen to apply force to the molded articles to release them from threaded members, yielding means positioned in said fixed resistance plate to move the yieldably supported mold plate against the force of the springs supporting it for a predetermined period of time after the mold opens, injecting means, rotatable threaded members extending through the mold plate and into the fixed plate cavities when the mold is closed to form the interior surface of the molded articles, and runner channels connecting the injecting means and the mold cavities, said springs being held under compression when the mold is closed and while the mold opens a predetermined distance to permit initial unscrewing, said springs thereafter moving said mold plate forward to urge the molded articles outwardly to strip them over the threads on said threaded members after the initial unscrewing has been accomplished.

3. In an injection molding device for forming simultaneously a plurality of threaded articles, the combination of a fixed resistance plate having mold cavities therein, a movable mold member, a mold plate supported by said movable mold member and movable toward and from said fixed plate, injection means, means for yieldably supporting said mold plate to urge said plate away from said movable mold member to apply force to the molded articles to release them from rotatable members, means counteracting the yielding means to hold said plate in engagement with said movable mold member during a portion of the path of travel of the movable mold member, rotatable members extending through the movable plate and into the fixed plate cavities when the mold is closed to form the interior surface of the molded articles, and runner channels connecting the cavities and the injecting means to permit composition to be injected into the cavities, said means for urging said mold plate away from said movable mold member being held under compression when the mold is closed and while the mold opens a predetermined distance, said yielding means thereafter moving said mold plate forward to urge the molded articles outwardly to strip them over the threads on said rotatable members.

4. In an injection molding device for forming simultaneously a plurality of threaded articles, the combination of a fixed resistance plate having mold cavities therein, a movable mold member, a mold plate supported by said movable mold member and movable toward and from said fixed plate, injecting means, spring means for yieldably supporting said mold plate to urge said plate away from said movable mold member to apply force to the molded articles to release them from rotatable members, spring means counteracting the yielding means to hold said plate in engagement with said movable mold member during a portion of the path of travel of the movable mold member, rotatable members extending through the movable plate and into the fixed plate cavities when the mold is closed to form the interior surface of the molded articles, and runner channels connecting the cavities and the injecting means to permit composition to be injected into the cavities, said means for urging said plate away from said movable mold member being held under compression when the mold is closed and while the mold opens a predetermined distance, said spring means thereafter moving said mold plate forward to urge the molded articles outwardly to strip them over the threads on said rotatable members.

5. In an injection molding machine for forming simultaneously a plurality of threaded articles, the combination of a fixed resistance plate having yielding means disposed therein, said fixed resistance plate also having cavities therein, a movable mold member, a mold plate supported by said movable mold member and movable toward and from said fixed plate, means for yieldably supporting said mold plate including springs so disposed as to urge said plate away from said movable mold plate to apply force to the molded articles to release them from the threaded members, injecting means, rotatable threaded members extending through the mold plate and into the fixed plate cavities when the mold is closed to form the interior surface of the molded articles, and runner channels connecting the injection means and the mold cavities, means disposed on said fixed plate to move said movable plate with said movable mold member while the mold opens a predetermined distance while the initial unscrewing is being accomplished, said spring-urged mold plate moving forward to urge the molded articles to move outwardly to strip them over the threads on said threaded members after the initial unscrewing has been accomplished.

6. In an injection molding machine for forming simultaneously a plurality of threaded articles, the combination of a fixed resistance plate having cavities therein, a movable mold member, a mold plate supported by said movable mold member and movable toward and from said fixed plate, means for yieldably supporting said mold plate to urge said plate away from said movable mold plate to apply force to the molded articles to release them from the threaded members, injecting means, rotatable threaded members extending through the mold plate and into the fixed plate cavities when the mold is closed, and runner channels connecting the injection means and the mold cavities, means disposed on said fixed plate to move said mold plate with said movable mold member while the mold opens a predetermined distance while the initial unscrewing is being accomplished, said movable mold plate moving forward to urge the molded articles outwardly to strip them over the threads on the threaded members after the initial unscrewing has been accomplished.

7. In an injection molding machine for forming simultaneously a plurality of threaded articles, the combination of a fixed resistance plate, a movable mold member, a mold plate supported by said movable mold member and movable toward and from said fixed plate, means for yieldably supporting said mold plate to urge said plate away from said movable mold plate to apply force to the molded articles to release them from the threaded members, injecting means, threaded members extending through the mold plate and into the fixed plate cavities when the mold is closed, and runner channels connecting the injection means and mold cavities, means disposed on said fixed plate to move said mold plate with said movable mold member while the mold opens a predetermined distance while the initial unscrewing is being accomplished, said movable mold plate thereafter moving forward to urge the molded articles outwardly to strip them over the threads on the threaded members after the initial unscrewing has been accomplished.

8. In an injection molding machine, a pair of relatively movable mold plates, the first mold plate having a mold cavity formed therein and the second mold plate having an opening therein for the passage of a force member therethrough into said cavity, means supporting a force member for passage of its end through the opening in said second mold plate for disposition within said cavity in the first mold plate to cooperate therewith in the formation of a molded article in said cavity when the mold is closed, resilient means disposed between the said second mold plate and said supporting means to move said supporting means with respect to said second mold plate, and means disposed on said first mold plate to move said supporting means with said second mold plate during the initial parting of the mold plates.

9. In an injection molding machine having means for radially severing the gate attached to molded articles, a pair of relatively movable mold plates, the first mold plate having a mold cavity formed therein and the second mold plate having an opening therein for the passage of a force member therethrough into said cavity, means supporting a force member for passage of its end through the opening in said second mold plate for disposition within said cavity in the first mold plate to cooperate therewith in the formation of a molded article in said cavity when the mold is closed, injecting means, runner channels connecting the injecting means with the mold cavities, resilient means disposed between the said second mold plate and said supporting means to move said supporting means with respect to said second mold plate, and resilient means disposed on said first mold plate to move said supporting means with said second mold plate during the initial parting of the mold plates.

GARDINER C. WILSON.

REFERENCES CITED

The following references are of record in the file of this patent:

UNITED STATES PATENTS

| Number | Name | Date |
|---|---|---|
| 1,916,692 | Schribner | July 4, 1933 |
| 1,944,571 | Rahm | Jan. 23, 1934 |
| 1,959,612 | Burke | May 22, 1934 |
| 2,339,443 | Wilson | Jan. 18, 1944 |

OTHER REFERENCES

Renwick, "Mold Designed to Trim Sprues," March 1942, p. 68.